Figure 1:
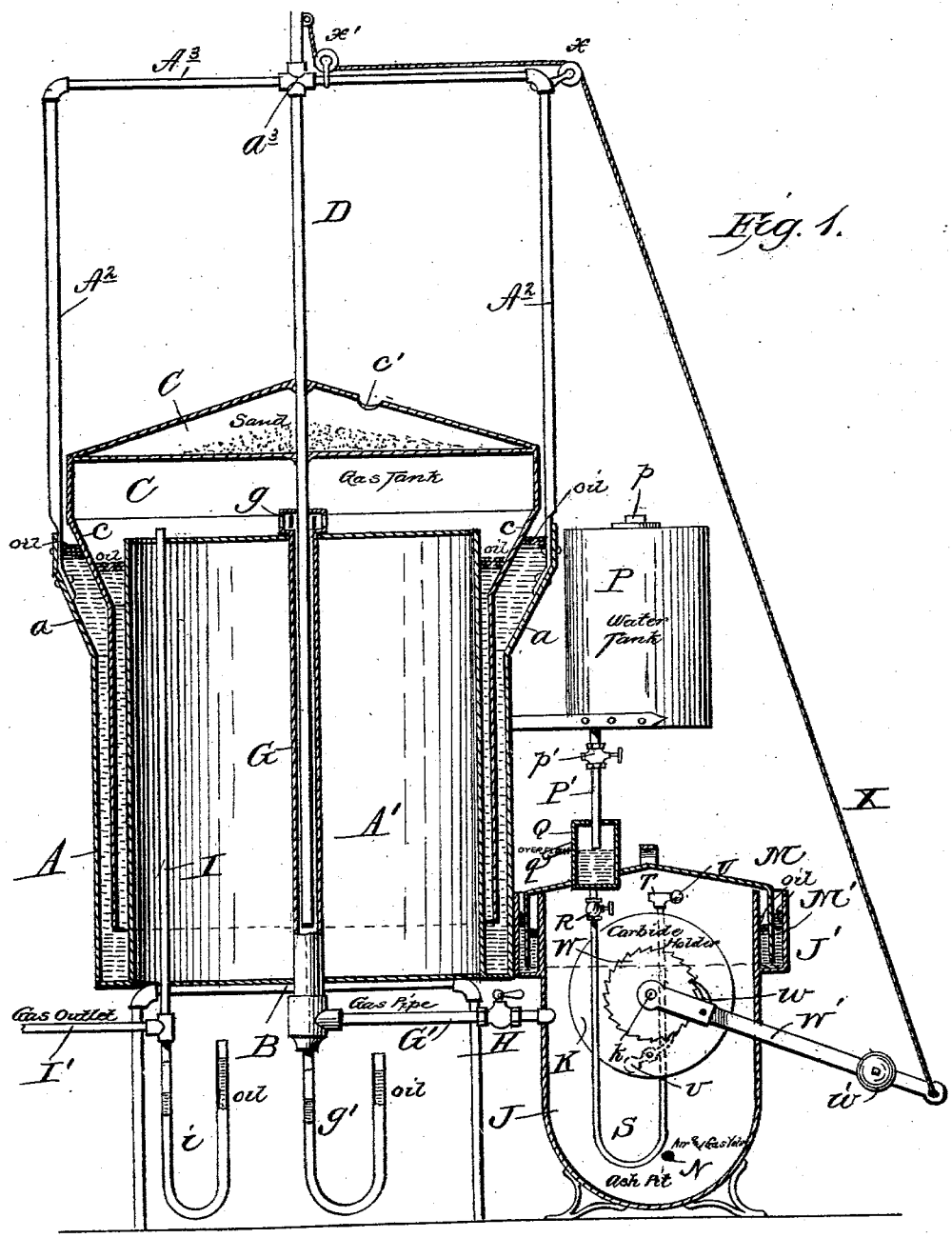

No. 629,855. Patented Aug. 1, 1899.
T. HENDERSON & W. A. STAPP.
ACETYLENE GAS GENERATOR.
(Application filed July 5, 1898.)
(No Model.) 2 Sheets—Sheet 2.
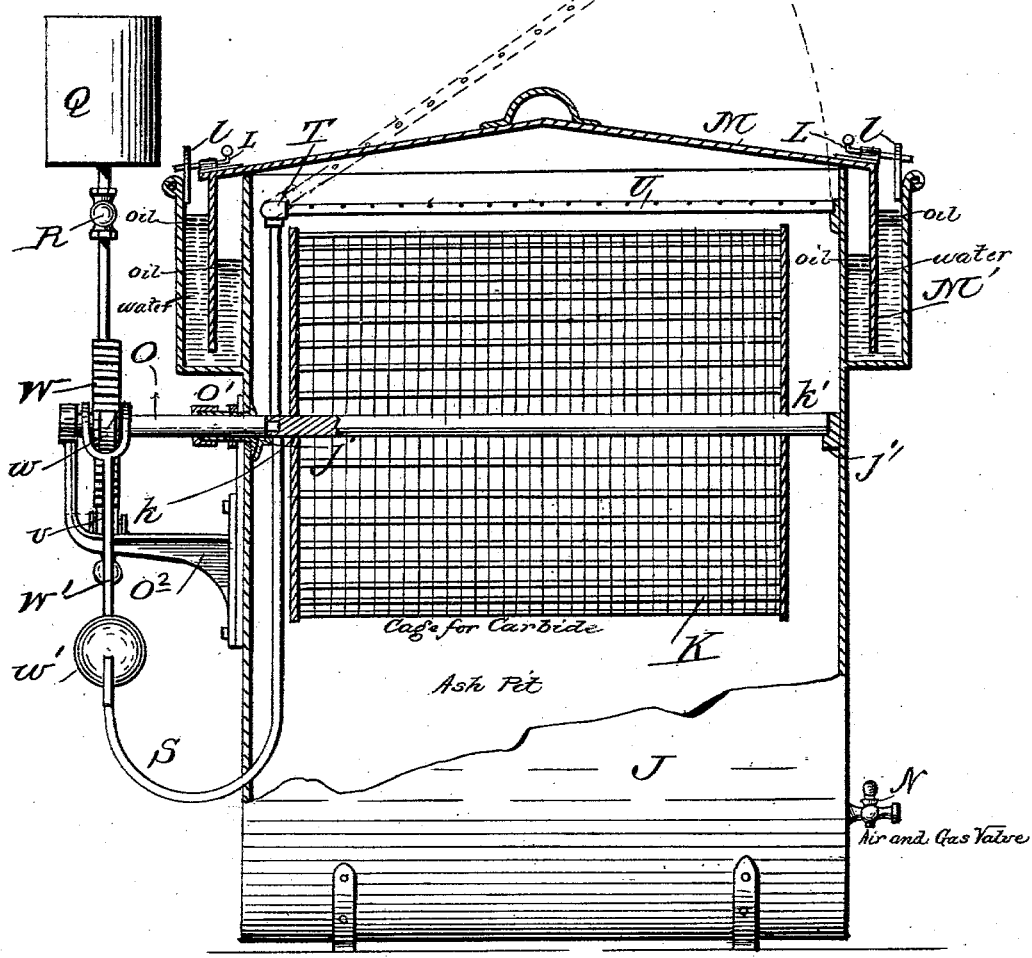
Fig. 2.
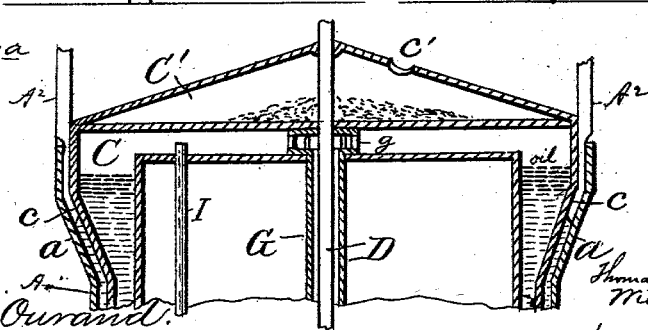
Fig. 1ª.
Witnesses
Franck L. Durand.
Geo. M. Copenhaver.
Inventors
Thomas Henderson
William A. Stapp
by Geo. H. Evans
Attorney

UNITED STATES PATENT OFFICE.

THOMAS HENDERSON AND WILLIAM A. STAPP, OF TYLER, TEXAS, ASSIGNORS, BY DIRECT AND MESNE ASSIGNMENTS, TO THE LONE STAR ACETYLENE GAS COMPANY, OF SAME PLACE.

ACETYLENE-GAS GENERATOR.

SPECIFICATION forming part of Letters Patent No. 629,855, dated August 1, 1899.

Application filed July 5, 1898. Serial No. 685,083. (No model.)

*To all whom it may concern:*

Be it known that we, THOMAS HENDERSON and WILLIAM A. STAPP, citizens of the United States of America, residing at Tyler, in the county of Smith, in the State of Texas, have invented certain new and useful Improvements in Acetylene-Gas Machines, of which the following is a specification.

Our invention relates to that class of acetylene-gas machines in which the carbid-receptacle is operated from the bell of the gas-receptacle through suitable devices.

The objects of this invention are as follows: to provide a simple and effective machine which will be automatic in its action and not liable to get out of order through the non-operation of the valves; to provide a novel construction of gas-tank and bell; to provide a novel removable carbid-holder in the form of a cylindrical screen-like cage and a simple operating mechanism therefor actuated from the gasometer-bell; to provide a swinging spray-pipe, so as to permit of the removal of the carbid-cage; to provide a simple and effective water-feed for the spray-pipe, and to provide a simple and effective form of generator and gasometer. These objects we accomplish by the mechanism illustrated in the accompanying drawings, in which—

Figure 1 is a sectional elevation of our improved machine, the water-cup Q, which lies beyond the generator, being also in section. Fig. 1$^a$ is a detail of the upper portion of the gas-tank and bell. Fig. 2 is a sectional elevation of the generator at right angles to the position shown in Fig. 1, the spray-pipe being swung up in dotted lines to the position it would occupy during the insertion and removal of the carbid-cage.

A is the annular gas-tank, in which dips the open lower straight end of the bell C, the upper ends of the bell and tank being enlarged or flared outwardly, as shown at $c$ $a$, respectively, and the tank being filled nearly full of water, having a seal of oil on its upper surface. The tank is supported on a suitable frame B, formed of piping, as shown in Fig. 1. The inner perpendicular cylindrical wall A' of the tank A is spaced from the interior of the outer wall, so as to form the annular water-space for the bell, and this cylinder A' is closed at both ends.

G is the vertical gas-inlet pipe supported centrally in the ends of the cylinder A' and provided at its upper end with perforations $g$ above the level of the oil for the escape of gas into the bell, the lower end of the pipe G being provided with a U-shaped drip-trap $g'$, sealed with oil, as shown in Fig. 1.

G' is a horizontal pipe leading from the generator J, to be presently described, to a pipe G just above the trap $g'$ and provided with a stop-cock H. I is the gas-outlet pipe mounted in the cylinder A', with its upper open end in the gas-space of the bell C and its lower end provided with a drip-trap $i$, filled with oil. These traps $g'$ $i$ catch any products of condensation that may gather in the machine or in the house-pipes.

I' is the pipe leading from pipe I to the service-pipes.

The top of the bell is formed with a compartment C', having an opening $c'$ for the introduction of sand to properly weight the bell.

A$^2$ A$^2$ are standards extending up from the upper edge of the gas-tank A and connected at their upper ends by a cross-bar A$^3$, at the middle of which is a guide-sleeve $a^3$, through which slides the upper half of a guide-rod D, carried centrally by the bell C, the lower half of the rod extending down into the pipe G, which is made large enough to serve as a guide therefor as well as to conduct the gas into the bell.

J is the generator, consisting of an open-top tank provided with a reservoir J' around its upper edge for the reception of a water and oil seal like that of the gasometer.

M is the tank-cover, having a depending flange M', which dips into the sealing fluids in the reservoir J' to prevent the escape of gas and render the use of gaskets and packed joints unnecessary. The cover M is secured in place by bolts L, which are shot through keepers $l$ on the upper edge of the reservoir J'.

K is the rotary horizontal carbid-cage, which may be formed of any suitable open-work material having suitable interstices or openings, wire screen being preferred. This cage has trunnions $k$ $k'$ in its closed ends, which are supported on the seat-bearings $j$ $j'$, the trunnion $k$ being provided with a squared socket to receive removably the similarly-shaped end of the short shaft O, mounted at its inner end in a packed bearing O' and at its outer end supported in the upper end of a bracket $O^2$. Thus it will be seen that the cage K may be readily inserted and removed. The shaft O, and with it the cage K, is intermittently rotated by means of a ratchet-wheel W, secured to said shaft and engaged by a pawl $w$, carried by the vertically-rocking lever W', fulcrumed on said shaft and provided with an adjustable weight $w'$. The lever W is given its upstroke to rotate the ratchet by means of a cord X, which extends from its outer end upwardly over a guide-pulley $x$ and then under a guide-pulley $x'$ to the upper end of the guide-rod D. Reverse rotation of the shaft O is prevented by the stop-pawl $v$.

P is a water tank or reservoir having a trap-screw $p$ in its top and an outlet-pipe P', extending down from its bottom and provided with a stop-cock $p'$. The lower end of the pipe P' extends down into a water-cup Q, just above the generator, and the rise and fall of the water in this cup cuts off and permits the flow, respectively, of water in pipe P'. The cup Q has an overflow-spout $q$ in one side.

The upper end of one arm of a vertical U-shaped trap-pipe S connects above its stop-cock R with the lower end of the water-cup Q, and its other arm extends up into the generator or tank J, where it is provided with a swivel T, to which one end of the horizontal spray-pipe U is secured. This spray-pipe U extends longitudinally over the carbid-cage K and discharges water upon the carbid contained therein. The spray-pipe may be swung up, as shown in dotted lines in Fig. 2, to permit the introduction and removal of the carbid-cage.

The operation is as follows: The cage K is filled with carbid and inserted in the generator, the pipe U is swung down, and the air and gas valve N in the bottom of generator is opened. The cover M is now secured in position and the valve N closed. To fill the tank P, close the cock $p'$ and open the trap screw or plug $p$. Then after closing or replacing the plug $p$ open the cock or valve $p'$ and allow the water to flow through the trap-pipe S to the spray-pipe U, which will spray it on the carbid and cause the gas to generate. The water in the U-shaped pipe S will prevent the escape of gas therethrough. As soon as the water in cup Q rises by pressure of gas to the end of pipe P' the flow from pipe P' ceases. As the water is used and falls below the end of pipe P' air is admitted to water-tank P, letting down a small quantity of water. In this way the water in cup Q remains at all times practically at the same level. In Fig. 1 the bell C is at its normal position when gas is burning. The pressure of gas is barely sufficient to hold the water in the cup Q, and therefore a small quantity escapes through the spray-pipe upon the carbid. As shown in Fig. 1, the outwardly-inclined wall $c$ of the bell is elevated above the inclined wall $a$ of the tank, and should the number of lighted burners be increased the bell will of course drop and its inclined wall $c$ will approach the inclined wall $a$, which will of course increase the gas area within the bell, and thereby allow the remaining gas to expand, which will temporarily reduce its pressure, the sealing medium spreading over the space between the straight wall of the cylinder A' and the wall $c$, as shown in Fig. $1^a$. It follows, therefore, that as the pressure of the gas on the column of water in pipe S decreases by reason of such expansion the water will flow from cup Q and be sprayed upon the carbid. This will increase the gas-pressure and raise the bell to its normal position of Fig. 1. At the time of the decrease in gas-pressure pipe P' will have been uncovered by the lowering of the water in cup Q and more water will have flowed into the cup from said pipe. As soon as the gas-pressure increases the water will rise in cup Q and close pipe P', and the bell will be raised by the increased gas-pressure to the position shown in Fig. 1, or even higher than that, which will decrease its gas area and cause an increased gas-pressure. It will be seen, therefore, that the flaring or enlarged upper ends of the tank and bell serve a most important purpose in that they cause a change of gas area with a corresponding change in gas-pressure which automatically regulates the flow of water to and from the cup Q. When the lights are all out, the bell rises gradually from the position shown in Fig. $1^a$, decreasing the area inside, owing to the fact of its inclined wall $c$ moving away from the inclined wall $a$ toward the upper end of the straight cylinder A', and thereby increasing the gas-pressure by such decrease of area sufficiently to hold the water in cup Q and stop the forming of gas. The larger the area covered by the bell the less the pressure under it, and vice versa. This is the principle that controls the water-supply to the carbid. When the bell is up, the water is held in the cup, and when the bell is down, as shown in Fig. 1, the water in the cup and the pressure of gas are about on a balance. In practice after the gas is turned out there is enough moisture left in the carbid-cage to make several feet of gas. This raises the bell C, which in turn revolves the carbid-cage through cord X, lever W', pawl $w$, ratchet W, and shaft O, thus shaking the ashes out of the cage into the bottom of the generator-tank, from which they may be removed when the cage is taken out for refilling. The rotation of the carbid-cage as just described not only discharges the ashes or spent material, but brings a fresh surface into position for the spray to act upon.

We employ oil as the sealing medium in order to prevent the carbid from drawing moisture from the surface of the water seals.

Our machine requires no attention except to refill the carbid-cage and the water-tank and is entirely automatic in its action.

The gas-pressure never exceeds four ounces, and so no blow-off, safety-valve, regulator, gage, or whistle is required. There are no valves to regulate the flow of the water, which is governed entirely by natural laws.

What we claim is—

1. The combination with the gasometer the bell of which has a central guide-rod, a guide-frame for said rod, and pulleys on said frame, of a generator-tank provided with a rotary carbid-holder provided with an operating pawl-and-ratchet mechanism, a cord or chain extending from the upper end of said guide-rod under and over said pulleys and down to the pawl-lever, and means for discharging water on the carbid.

2. A gasometer comprising the gas-tank having an annular chamber for the seal and provided with a flared or enlarged upper end, and a bell dipping at its lower end into said chamber and flared or enlarged at its closed upper end to correspond with the enlarged or flared upper end of the tank, substantially as and for the purpose set forth.

3. A gasometer comprising a tank having parallel inner and outer walls forming an annular sealing-chamber; the upper end of the outer wall being flared or inclined outwardly, and a bell dipping at its lower open end into said chamber and flared or inclined outwardly at its closed upper end, substantially as and for the purpose set forth.

4. The combination with a gas-generating chamber having a water-supply for the carbid, of a tank having an annular sealing-chamber and an enlarged or flared upper end, a bell dipping at its lower open end into said chamber and having a flared or enlarged closed upper end to change the internal area of the bell as described and thereby govern said water-supply, and a gas-pipe leading from the generator to the space within the bell, substantially as described.

In testimony whereof we affix our signatures in presence of two witnesses.

THOMAS HENDERSON.
WILLIAM A. STAPP.

Witnesses:
W. A. McKay,
D. P. Ewing.